United States Patent
Regan et al.

(10) Patent No.: US 7,508,774 B2
(45) Date of Patent: Mar. 24, 2009

(54) EXTENSIONS TO THE SPANNING TREE PROTOCOL

(75) Inventors: Joe Regan, Pleasanton, CA (US); Xiang-Ling Tan, San Jose, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 759 days.

(21) Appl. No.: 10/833,822

(22) Filed: Apr. 27, 2004

(65) Prior Publication Data

US 2004/0252634 A1 Dec. 16, 2004

Related U.S. Application Data

(60) Provisional application No. 60/466,249, filed on Apr. 28, 2003.

(51) Int. Cl.
*H04L 12/28* (2006.01)

(52) U.S. Cl. .................. 370/256; 370/389; 370/395.53; 370/397; 370/402; 370/409

(58) Field of Classification Search .................. 370/216, 370/254–256, 395.53, 401, 406, 409, 402; 709/238, 231
See application file for complete search history.

(56) References Cited

U.S. PATENT DOCUMENTS

| | | | |
|---|---|---|---|
| 5,878,232 A * | 3/1999 | Marimuthu | 709/249 |
| 6,032,194 A * | 2/2000 | Gai et al. | 709/239 |
| 6,188,694 B1 | 2/2001 | Fine et al. | |
| 6,515,969 B1 | 2/2003 | Smith | |
| 6,765,881 B1 * | 7/2004 | Rajakarunanayake | 370/256 |
| 6,813,250 B1 * | 11/2004 | Fine et al. | 370/256 |
| 7,076,594 B2 * | 7/2006 | Benedetto et al. | 710/316 |
| 2001/0025318 A1 * | 9/2001 | Higashiyama | 709/238 |
| 2002/0052936 A1 | 5/2002 | Gai et al. | |
| 2003/0026209 A1 | 2/2003 | Katz | |
| 2004/0081171 A1 * | 4/2004 | Finn | 370/395.53 |
| 2004/0221087 A1 * | 11/2004 | Benedetto et al. | 710/316 |
| 2005/0138008 A1 * | 6/2005 | Tsillas | 707/3 |

\* cited by examiner

*Primary Examiner*—Edan Orgad
*Assistant Examiner*—Venkatesh Haliyur

(57) ABSTRACT

Extending the Spanning Tree Protocol (STP) to provide redundancy and avoid loops in the topology of a service domain associated with a data transport service provided using a provider core network is disclosed. At each of a plurality of provider edge (PE) devices participating in the service, each participating PE being connected to the other participating PE's by a full mesh of mesh connections through the provider core network, a virtual core port is defined that encompasses all of the ports on the PE that are associated with a mesh connection from the PE to one or more other PE's participating in the service. Each participating PE is configured to associate the virtual core port with a virtual core bridge representing the core of the service domain. It is ensured that the virtual core bridge becomes and remains the root bridge.

14 Claims, 11 Drawing Sheets

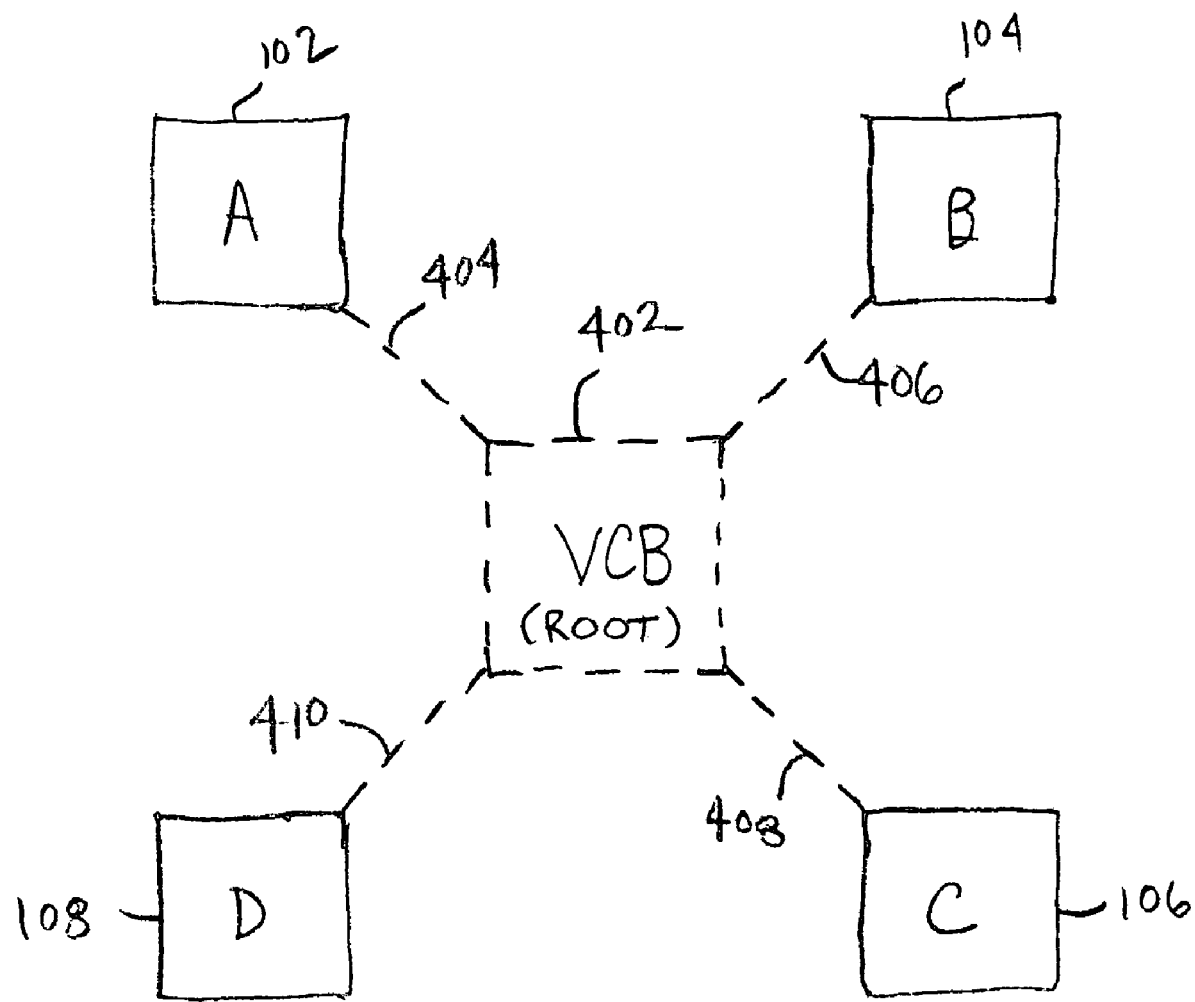
FIG. 4-B

EXTENSIONS TO THE SPANNING TREE PROTOCOL

CROSS REFERENCE TO RELATED APPLICATIONS

This application claims priority to U.S. Provisional Patent Application No. 60/466,249 entitled EXTENSIONS TO THE SPANNING TREE PROTOCOL FOR VIRTUAL PRIVATE LAN SERVICES filed Apr. 28, 2003, which is incorporated herein by reference for all purposes.

FIELD OF THE INVENTION

The present invention relates generally to networks. More specifically, extensions to the spanning tree protocol (STP) are disclosed.

BACKGROUND OF THE INVENTION

The Spanning Tree network protocol (STP) provides path redundancy while preventing undesirable loops in the network. STP defines a tree that spans all switches in an extended network and places selected redundant paths in a standby or blocked state. Specifically, the STP algorithm ensures that if multiple paths exist to the same destination, then all but one will be blocked.

When using STP to provide for path redundancy and prevent undesirable loops in connection with a core provider network used to provide a plurality of services, not all of which require or involve the participation of all provider edge devices associated with the core network, the spanning tree protocol may yield undesirable results, such as blocking all of the paths that provide connectivity between a subset of provider edge (PE) devices participating in a particular service, e.g., a transparent LAN service (TLS). It is possible to run a separate instance of the STP for each service being provided using the core network, but that approach becomes unmanageable where hundreds or thousands of different services are provided using the same core network. Therefore, an extension to the STP that supports the provision of a large number of services, not each involving the participation of all PE's of a core network, without requiring that a separate instance of the STP be run for each service, is needed.

In addition, each service may be associated with one or more customer networks, each of which may and probably will be running an instance of the STP (or a similar protocol for preventing loops). However, not every implementation of the STP or similar protocol will be the same. Therefore, there is a need for a way for an instance of the STP running on a core provider network to interact with instances of STP (or similar protocols) running on customer networks connected to the provider's core network.

BRIEF DESCRIPTION OF THE DRAWINGS

Various embodiments of the invention are disclosed in the following detailed description and the accompanying drawings.

FIG. 4B shows an alternate representation of the VCB 402 and the virtual core ports 404-410 by which PE's 102-108, respectively, are configured to understand themselves to be connected to the VCB 402 for purposes of the STP.

DETAILED DESCRIPTION

The invention can be implemented in numerous ways, including as a process, an apparatus, a system, a composition of matter, a computer readable medium such as a computer readable storage medium. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Extensions to the spanning tree protocol (STP) are disclosed. A virtual core bridge (VCB) that represents the network core is simulated. It is ensured that the virtual core bridge becomes and remains the root bridge. In some embodiments, the root bridge priority associated with the VCB is zero, ensuring that it becomes the root bridge. In some embodiments, a validity check is done on bridge protocol data units (BPDU's) received at a provider edge device from outside the core network to ensure that the VCB will remain the root bridge. Learning to communicate with an instance of the STP (or similar protocol) running on an external (e.g., customer) network connected to the core network is disclosed. The version/type of the STP instance running on the external network is detected, and the core network STP uses the format appropriate to the version/type of STP running on the external network to exchange STP-related data with the external network.

Figure 1A:
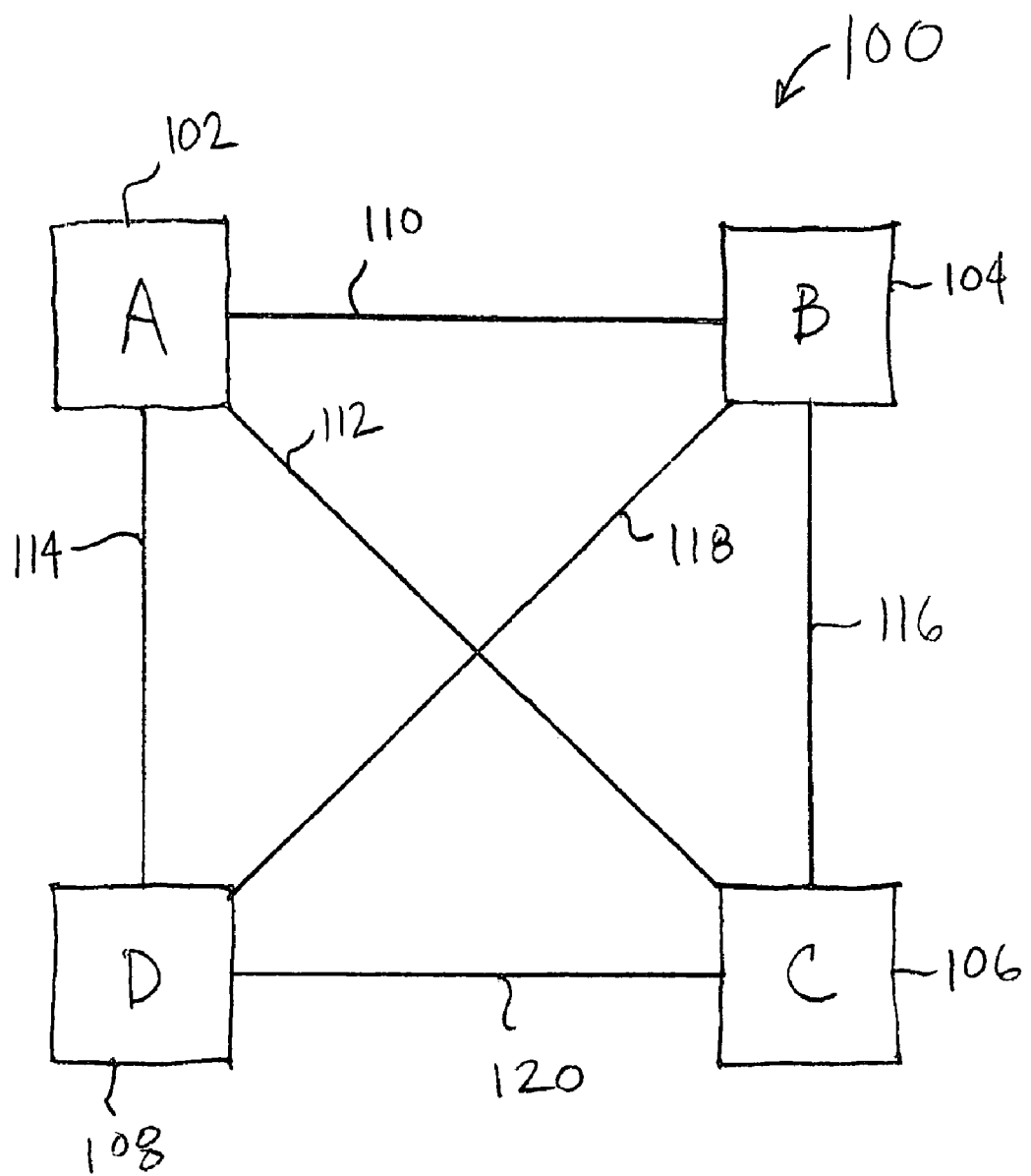
FIG. 1A shows an exemplary network in which the spanning tree protocol may be employed.

FIG. 1A shows an exemplary network in which the spanning tree protocol may be employed. A core provider network 100 comprises four provider edge (PE) devices A-D, labeled 102, 104, 106, and 108, respectively, in FIG. 1A. PE's 102-108 are connected in a full mesh by mesh connections 110-120. While connections 110-120 comprise mesh connections in a core provider network in this example, the principles described in connection with FIGS. 1A and 1B apply as well to other types of networks having other types of connection. One can see from FIG. 1A that the full mesh of connections 110-120 makes available to each of the PE's 102-108 multiple possible paths to each other node, providing a high degree of redundancy. For example, PE 102 can reach PE 104 either via the direct path of connection 110 or indirectly through PE 106, e.g., via the path comprising connection 112, PE 106, and connection 116. However, this configuration also creates the possibility of loops in the network, whereby the same data packet, frame, or other unit of data could arrive at a node (e.g., one of the PE's) via multiple paths, forwarded by more than one other node, resulting in inefficiency and potentially confusion. This risk is present particularly when the communications protocols being used do not result in a data frame "timing out" after a prescribed period, as is the case with, for example, layer 2 LAN protocols. For example, if PE 102 were to broadcast a data frame to PE's 104, 106, and 108 (e.g., because PE 102 did not know which of the PE's was associated with the destination address for the data frame), there is a risk that PE 106, e.g., might forward the frame on to PE's 104 and 108 (e.g., if the destination address were not known to PE 106), one of which might further forward the frame back to PE 102. The spanning tree protocol eliminates such loops by electing one switch or network bridge to function as the "root bridge" for the network (or that part of the network for which the instance of the STP is running), having each participating switch or bridge that is not the root bridge identify as its "root port" the port on that switch or bridge that represents the lowest cost path from that node to the root bridge, and blocking (e.g., by placing in standby or backup mode) paths that might otherwise result in a loop. In this way, the root bridge becomes the root of a minimum spanning tree providing connectivity between all nodes, without loops. Paths placed in standby mode may be activated as needed, e.g., for redundancy or in response to changes in the network topology that generate in changes to the spanning tree.

Figure 1B:
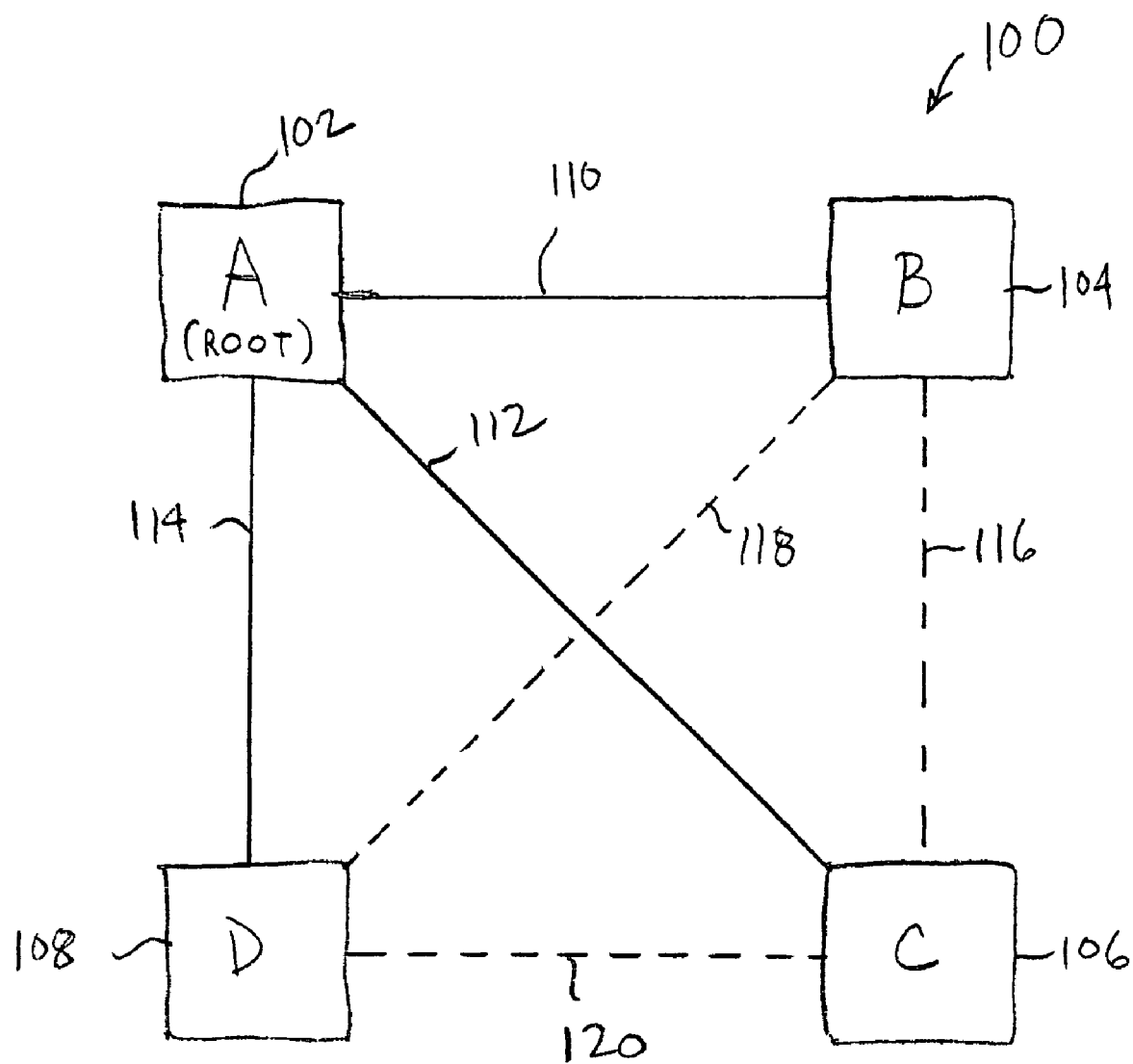
FIG. 1B illustrates how the spanning tree protocol might operate in the exemplary network of FIG. 1A.

FIG. 1B illustrates how the spanning tree protocol might operate in the exemplary network of FIG. 1A. In the example shown, PE 102 has been elected to function as the root bridge. PE 104 has identified its port associated with connection 110 as its root port, PE 106 has identified its port associated with connection 112 as its root port, and PE 108 has identified its port associated with connection 108 as its root port. The ports on PE's 104, 106, and 108, respectively, associated with connections 116, 118, and 120 have been placed in a blocked or standby state. In this way, loops such as those described above are eliminated while the standby paths remain available for use if needed, e.g., for redundancy.

Figure 2:
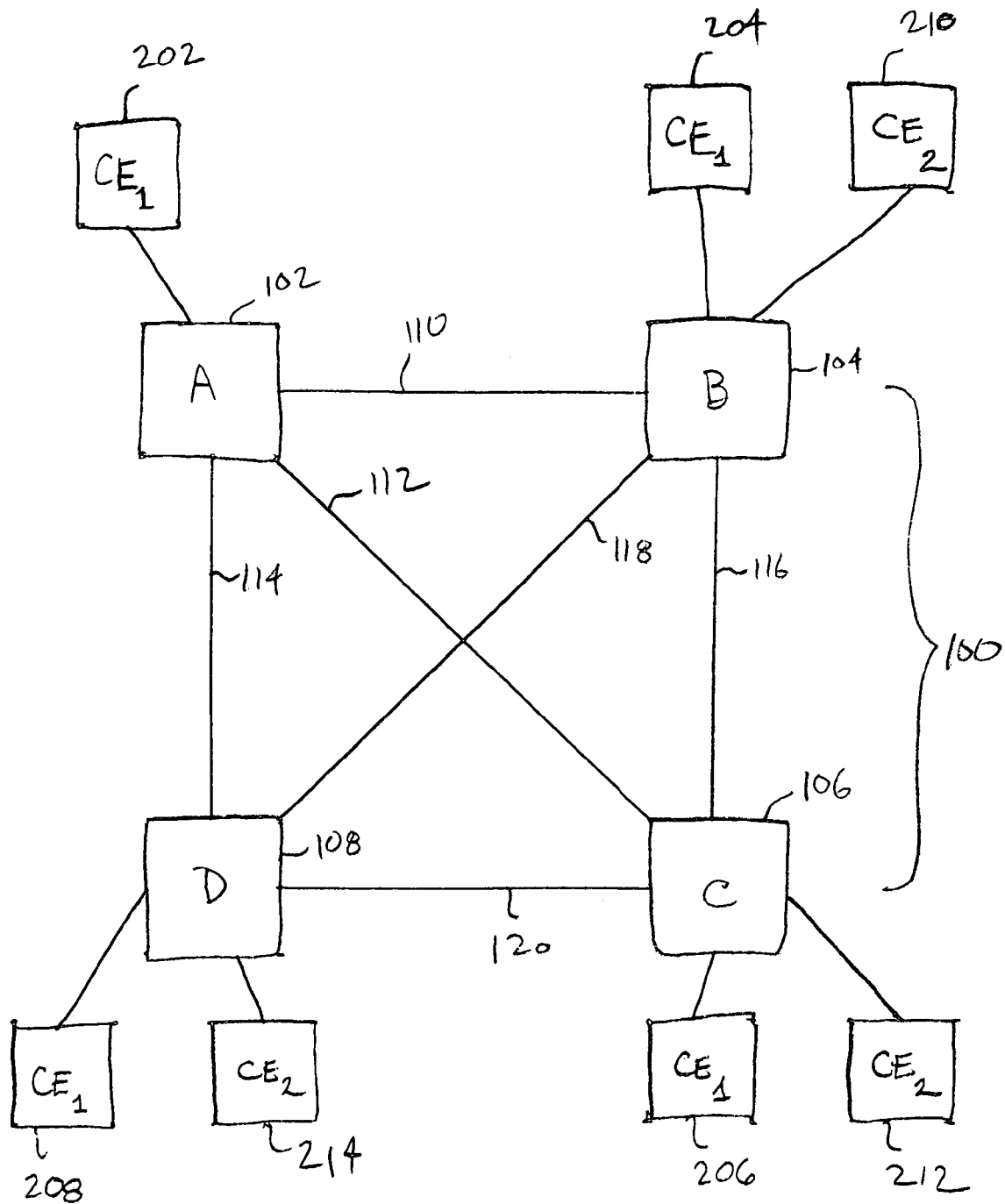
FIG. 2 shows the provider core network 100 with customer edge (CE) devices connected to it.

FIG. 2 shows the provider core network 100 with customer edge (CE) devices connected to it. In some embodiments, the provider core network 100 is used to provide a plurality of data transport services to one or more customers, e.g., transparent LAN services such as virtual private LAN services by which two or more remote customer networks may be joined into a single virtual LAN. In the simplified example shown, CE's 202, 204, 206, and 208 are associated with a first customer or service and are connected to the core provider network 100 through connections to PE's 102, 104, 106, and 108, respectively. CE's 210, 212, and 214 are associated with a second customer or service and are connected to the core provider network 100 through connections to PE's 104, 106, and 108, respectively. While two customers/services are shown in FIG. 2, in an actual implementation hundred or thousands of services may be provided using the same core provider network.

The example shown in FIG. 2 illustrates a potential problem with using the STP to eliminate loops in a core provider network used to provide a plurality of transport services, such as TLS or similar services. In the example shown, the second customer or service is connected to the core network through PE's 104-108. If, as in the example shown in FIG. 1B, a single instance of the STP were run for the core provider network, connectivity between these nodes would be lost as a result of paths 116, 118, and 120 being blocked.

Figure 3A:
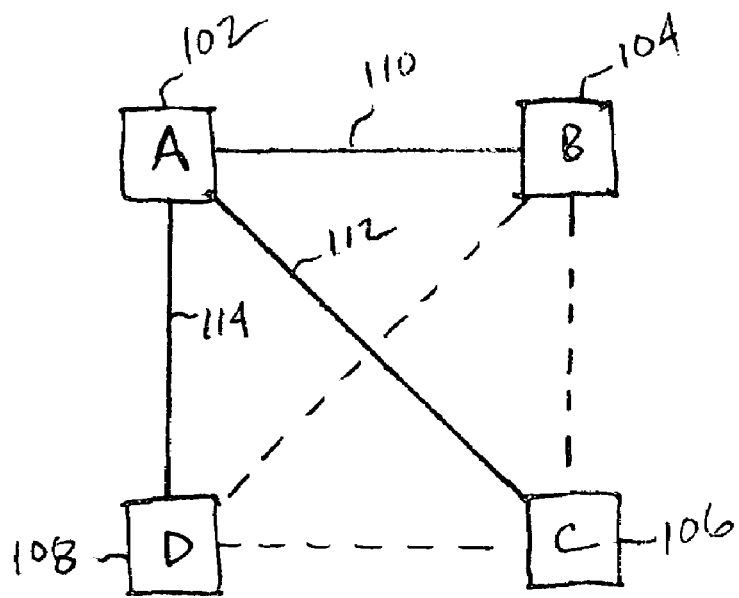
FIG. 3A shows a possible result of running a first instance of the STP with respect to the first service, associated with CE's 202-208.
Figure 3B:
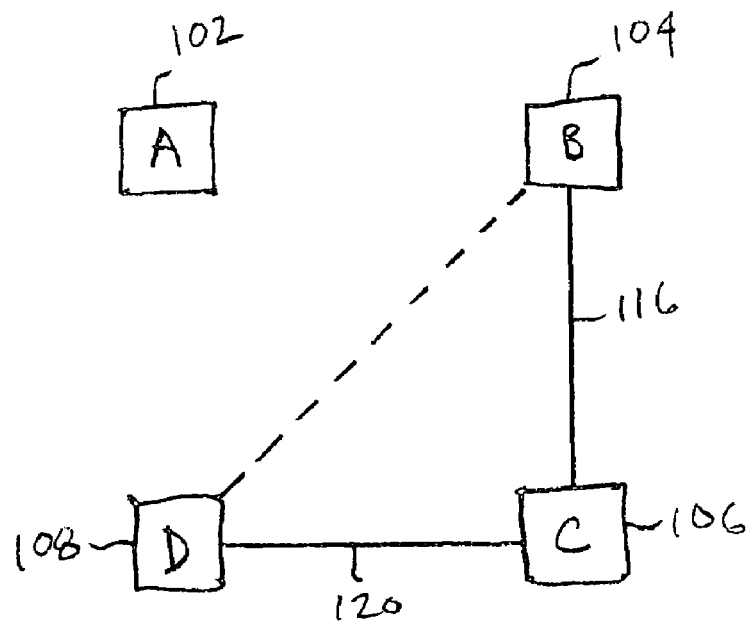
FIG. 3B shows a possible result of running a second instance of the STP with respect to the second service, associated with CE's 210-214.

One potential solution to this problem that has been suggested is to run a separate instance of the STP for each customer/service, such that each service would have its own root bridge and a spanning tree defined to avoid loops within the subset of nodes participating in the service. FIGS. 3A and 3B illustrate one possible set of results that may be obtained by running separate instances of the STP for the first and second services shown in FIG. 2. FIG. 3A shows a possible result of running a first instance of the STP with respect to the first service, associated with CE's 202-208. The result shown is the same as that described above in connection with FIG. 1B, with PE 102 being elected as the root bridge and the most direct paths (connections 110, 112, and 114) being identified as the primary paths from the other participating PE's to the root bridge. FIG. 3B shows a possible result of running a second instance of the STP with respect to the second service, associated with CE's 210-214. In this example, PE 106 has been elected as the root bridge, and connections 116 and 120 identified as the primary paths from PE's 104 and 108, respectively, to the root bridge.

While the approach shown in FIGS. 3A and 3B avoids having the STP result in a loss of connectivity for a service, the solution does not scale well. A typical provider core network may comprise dozens or more PE's and may be required to support hundreds or thousands of services. As the size of the provider core network and the number of services supported grows, the overhead and other cost associated with implementing, running, and administering thousands of instances of the STP becomes too costly and may become unmanageable. Therefore, a more scalable solution to the problem described above is required.

Figure 4A:
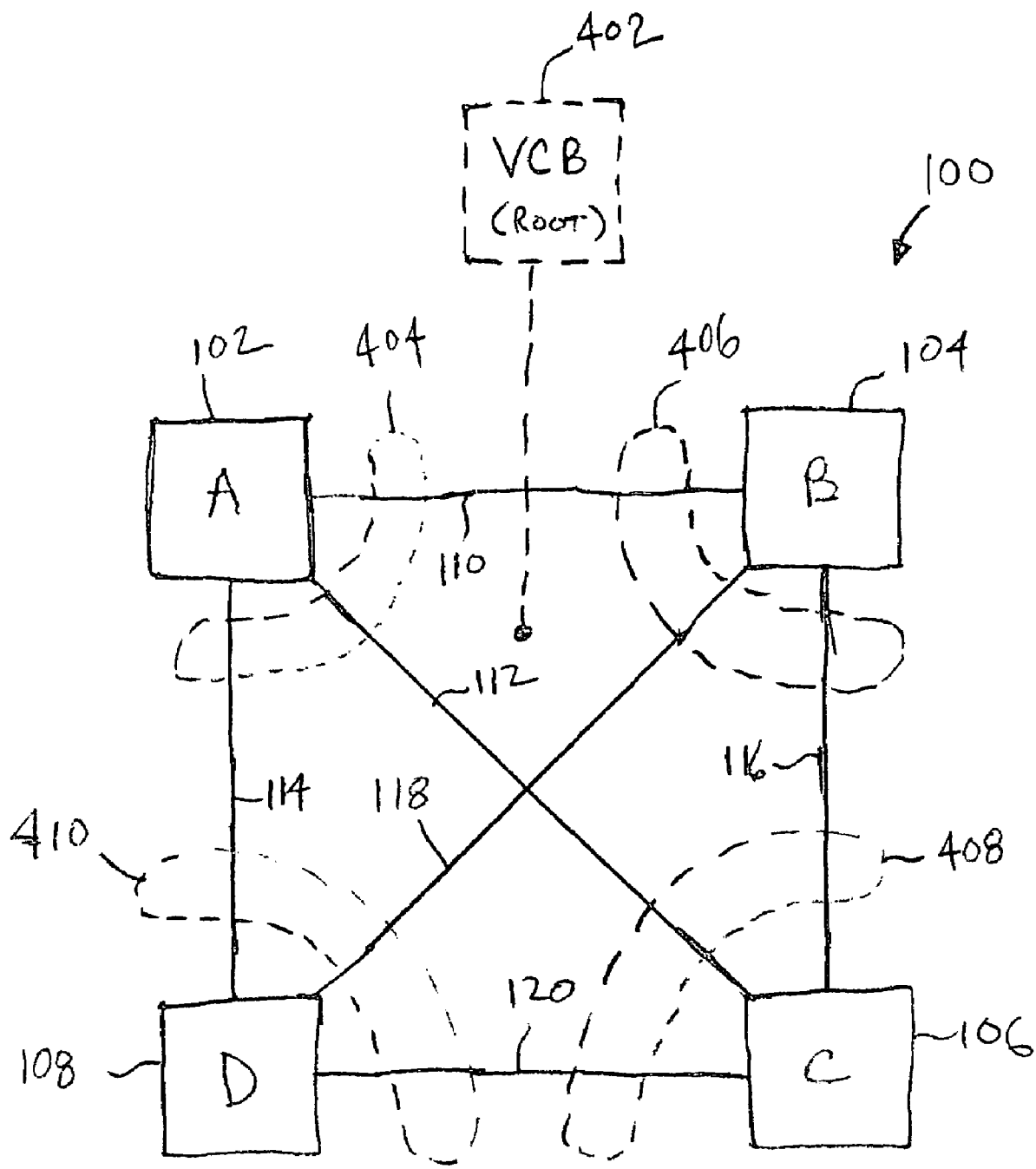
FIG. 4A illustrates an approach used in some embodiments to implement the STP with respect to a provider core network that supports a large number of services not all of which require the participation of every PE of the core network.

FIG. 4A illustrates an approach used in some embodiments to implement the STP with respect to a provider core network that supports a large number of services not all of which require the participation of every PE of the core network. For each service, a virtual core bridge 402 that represents the network core is simulated. The virtual core bridge 402 is not an actual physical switch or bridge, but instead is a virtual bridge that is represented at each PE participating in the service by a virtual root bridge protocol data unit (VRBPDU). Under the STP, network bridges and switches exchange bridge protocol data units (BPDU) comprising, inter alia, information about themselves and the switch/bridge that they believe to be the root bridge for the spanning tree. Each node advertises its own bridge identifier and its "priority" (a measure, determined as set for the in the STP standard, of how desirable the switch/bridge is as a candidate for root bridge), as well as the bridge identifier and priority of the bridge that the node believes is the current root bridge. The STP uses this information to "elect" the root bridge, as well as to determine at each node which port will be the "root port" for that node, as described above. The bridge with the lowest priority (zero is the lowest possible priority) will be elected root bridge, with ties being broken based on the bridge identifier.

In some embodiments, the VRBPDU is configured to represent the network core at each PE participating in the service as a virtual core bridge, such as VCB 402 of FIG. 4A. (Note that in the example shown, all four of PE's 102-108 participate in the service. In other embodiments, fewer than all of the PE's may participate.) On each PE, the VRBPDU is associated with a virtual core port (VCP) comprising the PE's mesh connections to the other participating PE's (i.e., to the core of the service domain). For example, for PE 102 the VRBPDU is associated with a VCP 404 comprising connections 110, 112, and 114. Similarly for PE 104 the VRBPDU is associated with a VCP 406 comprising connections 110, 116, and 118; for PE 106 the VRBPDU is associated with a VCP 408 comprising connections 116, 112, and 120; and for PE 108 the VRBPDU is associated with a VCP 410 comprising connections 114, 118, and 120. FIG. 4B shows an alternate representation of the VCB 402 and the virtual core ports 404-410 by which PE's 102-108, respectively, are configured to understand themselves to be connected to the VCB 402 for purposes of the STP.

Each VRBPDU comprises a root priority field set to zero, the lowest possible value, to ensure that the likelihood of another node, e.g., one external to the core network such as a customer bridge, becoming root is negligible. Stated another way, it is unlikely that a customer bridge will have a priority of zero, so setting the priority of the virtual core bridge 402 to zero nearly ensures that the VCB will become the root bridge. In some embodiments, the VRBPDU is configured at rather than sent to the participating PE's, which ensures that the VRBPDU does not age.

In some embodiments, to further ensure that the VCB remains the root bridge, a validity check is done on each BDPU received at a PE. If the root bridge identifier of a received BPDU does not match the root bridge identifier associated with the VCB and the root bridge priority of the received BPDU is zero, the BPDU is discarded and the port on which the BPDU was received enters the blocked (standby) state. In some embodiments, PE access ports may be used to provide a plurality of virtual ports, such as by using software to define a plurality of service-based access points that share a single physical port. In some such embodiments, if a BPDU identifying a bridge other than the VCB as the root bridge with a priority of zero is received, only the service-based access point associated with the service with which the BPDU is associated is blocked, so that other services may continue to use the shared physical port.

In some embodiments, a protocol other than the STP may be used to provide for redundancy and prevent loops within the core network. In some embodiments, one or more layer 3 forwarding protocols (e.g., interior gateway protocols (IGP) such as Open Shortest Path First (OSPF)) may be used to provide redundancy and prevent loops in the core network. Some such forwarding protocols provide the features of the STP with advantages such as load sharing, better protocol fault isolation, and proven scalability. In some such embodiments, extending and modifying the STP as described herein ensures that the STP does not interfere with or cause complications with the operation of the IGP forwarding decisions. In embodiments in which a protocol other than the STP is used to provide redundancy and avoid loops in the core network, the STP extended as described herein is still useful for providing redundancy between the PE's and equipment outside the network core (e.g., CE's), and for handling forwarding paths outside the core network, e.g., between CE's, that could result in a loop.

Figure 5:
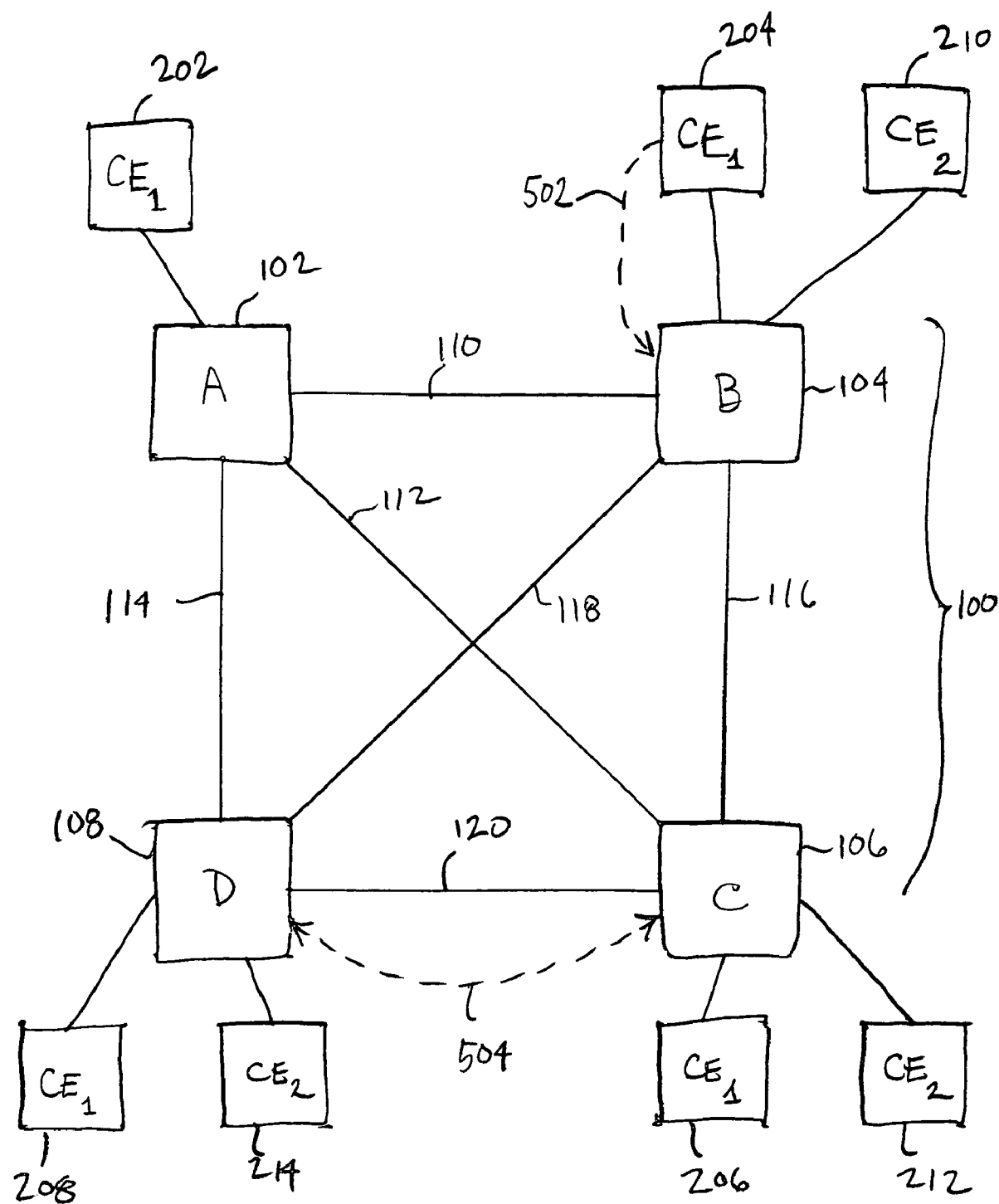
FIG. 5 shows the exemplary network of FIG. 2 with potential loop paths 502 and 504 shown.

FIG. 5 shows the exemplary network of FIG. 2 with potential loop paths 502 and 504 shown. Loop path 502, shown in FIG. 5 providing a path from CE 204 to the core provider network 100 via PE 104, illustrates the risk that absent a properly configured instance of the STP a CE device might send back into the core network 100 a packet received from the core via a PE to which the CE is connected. Similarly, loop path 504 illustrates that absent a properly configured instance of the STP a PE having a non-mesh connection or path to another PE might send a packet received from the core via a mesh connection to another participating PE via the non-mesh connection, potentially resulting in an undesirable loop. Configuring the PE's to implement the STP extended as described above avoids such loops. For example, if PE 104 were configured to recognize the core network 100 as comprising a virtual core bridge to which its mesh connections 110, 116, and 118 comprise a virtual core port by which it is connected to the virtual core bridge, and the VCB is configured on PE 104 to have a priority of zero and PE 104 is configured to perform a validity check on received BPDU's as described above to ensure that the VCB remains the root bridge, the path 502 would be prevented from becoming the root port on PE 104, thereby preventing the loop path. Likewise, the path 504 would be prevented from becoming the root port on PE 106, eliminating the potential loop path.

Figure 6:
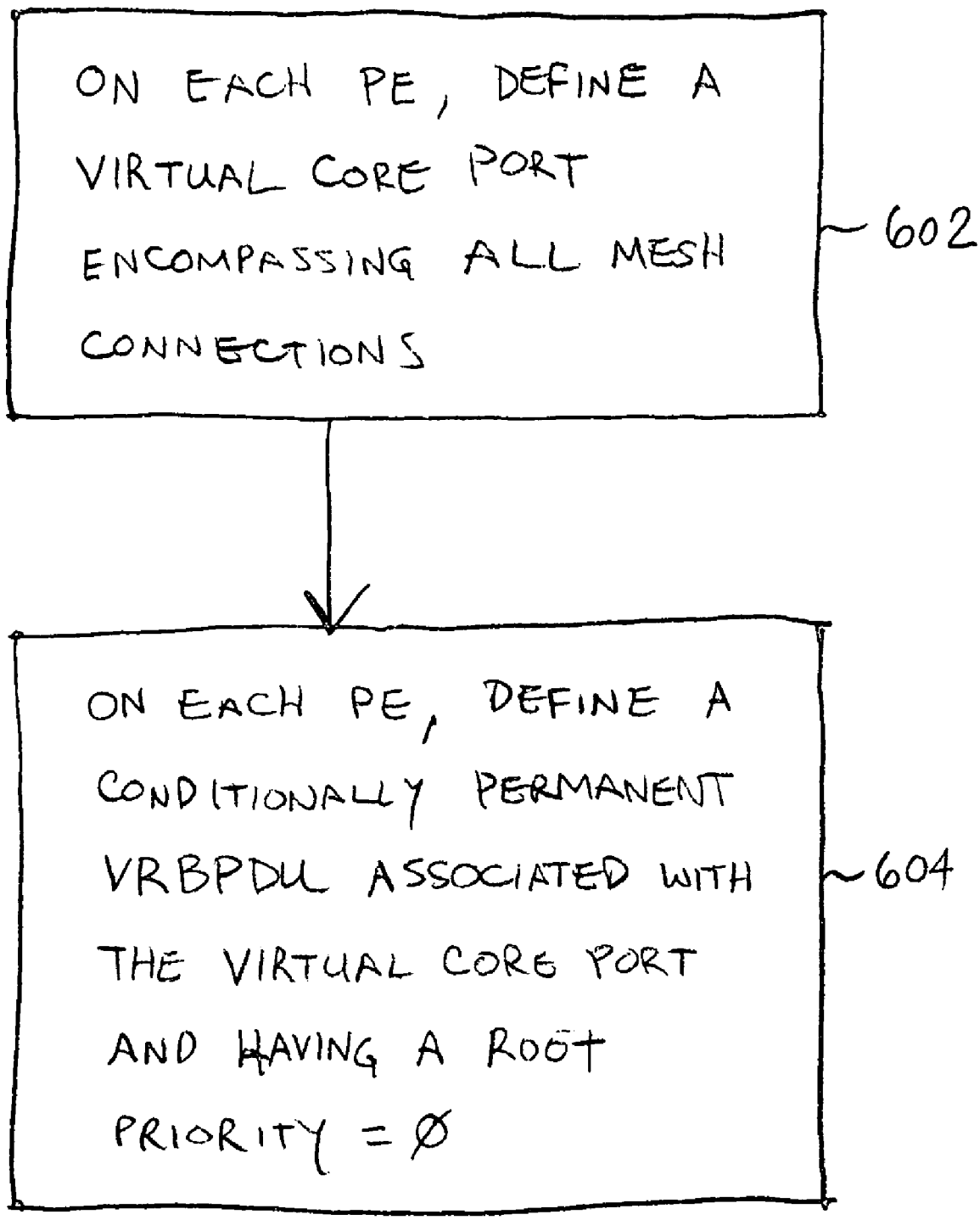
FIG. 6 is a flow chart illustrating a process used in some embodiments to simulate a virtual core bridge on a core provider network.

FIG. 6 is a flow chart illustrating a process used in some embodiments to simulate a virtual core bridge on a core provider network. In step 602, on each PE a virtual core port is defined that comprises all of the PE's mesh connections to the core network. In step 604, on each PE a conditionally permanent VRBPDU is defined. The VRBPDU is associated with the virtual core port and has a root priority of zero.

Figure 7:
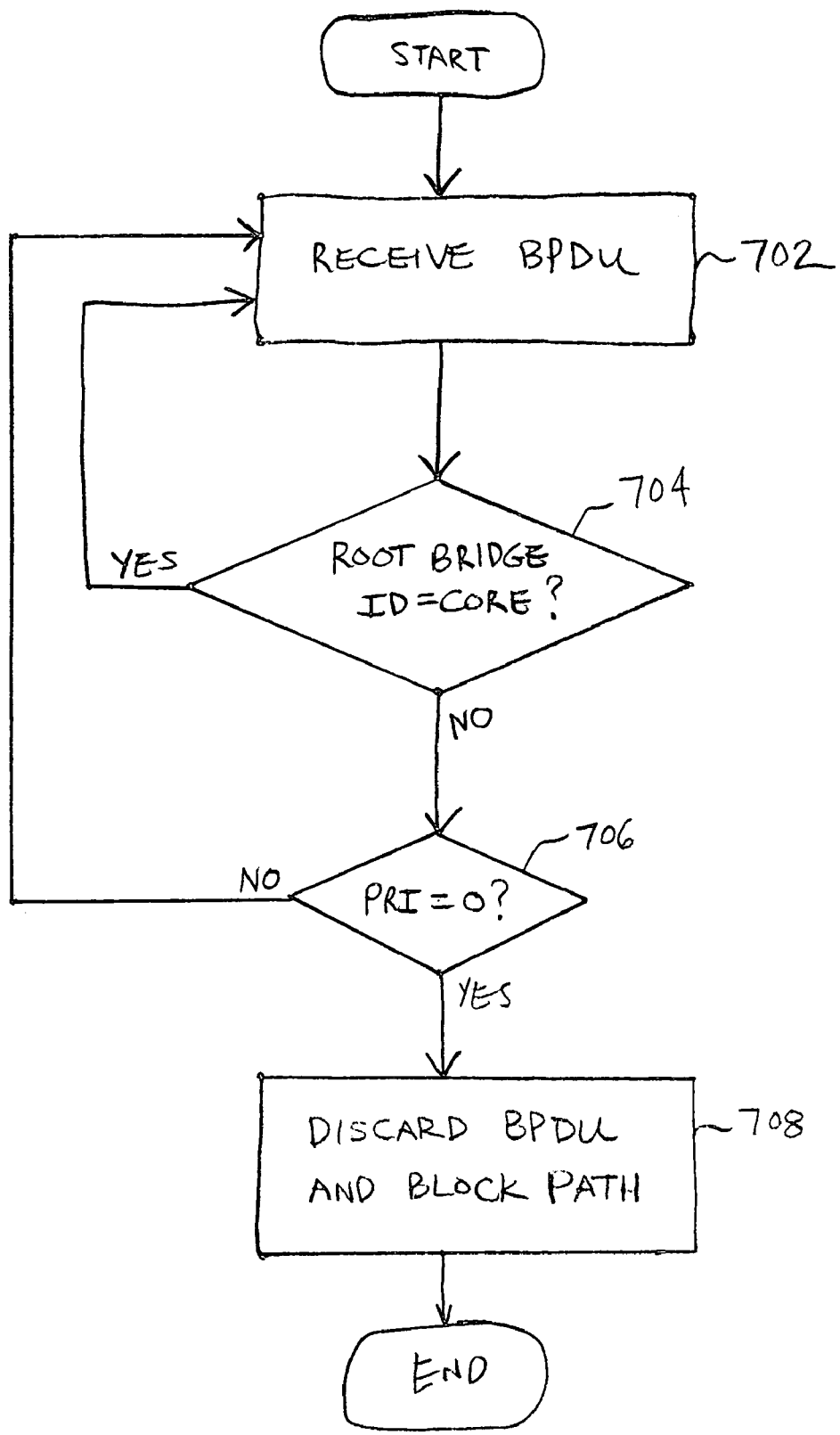
FIG. 7 is a flow chart illustrating a process used in some embodiments to perform a validity check on BPDU's received from a customer bridge.

FIG. 7 is a flow chart illustrating a process used in some embodiments to perform a validity check on BPDU's received from a customer bridge. In step 702, a BPDU is received. In step 704, it is determined whether the root bridge identifier of the BPDU matches the identifier associated with the virtual core bridge. If the root bridge identifier matches the identifier associated with the VCB, the BPDU is processed normally and the process of FIG. 7 returns to step 702, where the process begins again when the next BPDU is received. If it is determined in step 704 that the root bridge identifier of the received BPDU does not match the identifier associated with the VCB, the process proceeds to step 706, in which it is determined whether the root bridge priority field has a value of zero. If the root bridge priority of the BPDU is not zero (i.e., it is greater than zero, by definition, since zero is the lowest possible value), the process returns to step 702, where the process begins again when the next BPDU is received. If it is determined in step 706 that the root bridge priority of the BPDU is zero, the process advances to step 708, in which the BPDU is discarded and the path with which the BPDU is associated is placed in the blocking (standby) state for STP purposes, after which the process ends. A port in the block state does not participate in frame forwarding. In some embodiments, after step 708 the process returns to step 702, where the process resumes as subsequent BPDU's are received. In some embodiments, the blocked state entered in step 708 persists until the discarded BPDU has aged out in accordance with the Max Info Age timer prescribed by the STP standard. In some embodiments, step 708 comprises placing a port in a blocked or standby state. In some embodiments, as noted above, step 708 comprises placing a service-based access point associated with the BPDU in a blocked or standby state.

Figure 8:
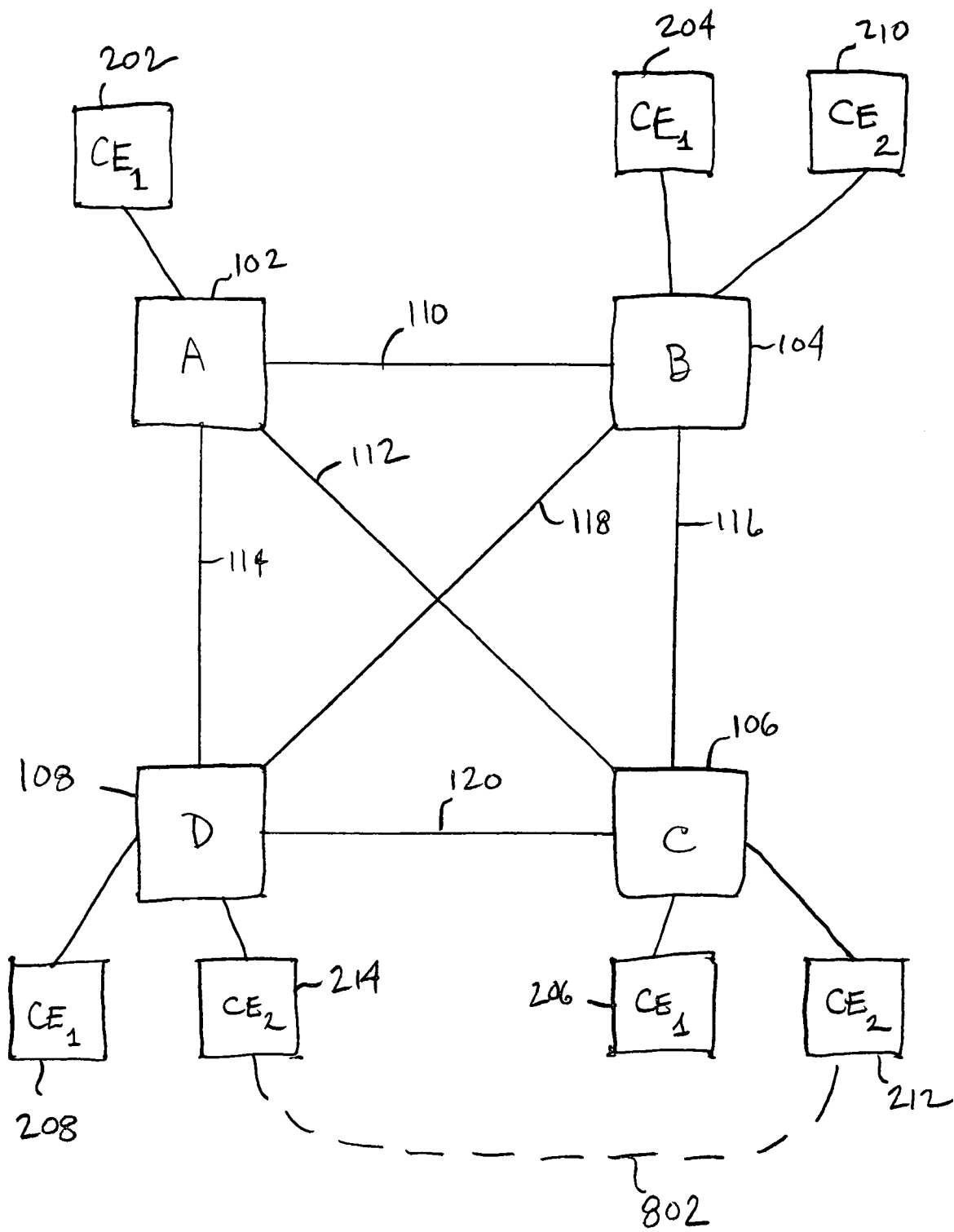
FIG. 8 shows the exemplary network of FIG. 2 with potential loop path 802 shown.

FIG. 8 shows the exemplary network of FIG. 2 with potential loop path 802 shown. FIG. 8 illustrates the fact that the STP instance running with respect to the provider core network must be able to interact with the customer STP instance (s) to eliminate potential loop paths such as path 802, shown in FIG. 8 as providing a path between CE 214 and CE 212. A difficulty in interacting with an instance of the STP running on the customer's (or other) network is that different versions or implementations of the STP may use a slightly different format to exchange STP-related data. For example, the format of the BPDU may be different, e.g., depending on the approach used to provide a spanning tree topology on a per-VLA N basis (e.g., "q" tags, Cisco™ Per VLAN Spanning Tree (PVLAN), etc.). In some embodiments, these differences are handled by detecting the format being used on the customer (or other) network and using the detected format to exchange data with the STP instance running on the customer network.

Figure 9:
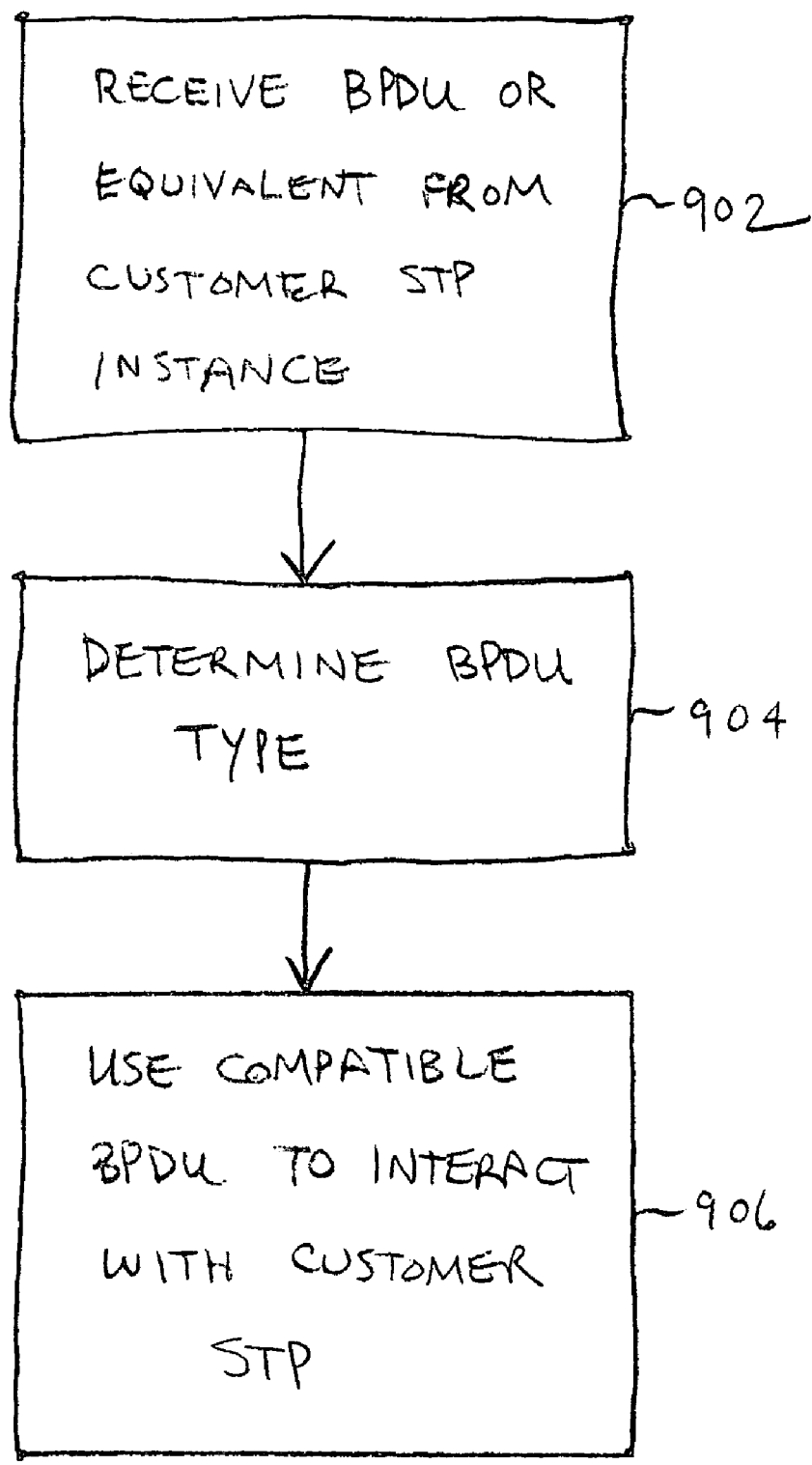
FIG. 9 illustrates a process used in some embodiments to interact with an STP instance running on a customer (or other) network.

FIG. 9 illustrates a process used in some embodiments to interact with an STP instance running on a customer (or other) network. In step 902, a BPDU or equivalent data unit associated with an instance of the STP running on a customer network is received from the customer network. In step 904, the BPDU or data unit type (e.g., format) is detected. In step 906, BPDU's (or other data units) of the same (or an otherwise compatible) type are used to interact with the STP instance running on the customer network, e.g., as required to prevent paths such as path 802 of FIG. 8 from resulting in loops in the network topology.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for extending the Spanning Tree Protocol (STP) to provide redundancy and avoid loops in the topology of a service domain associated with a data transport service provided using a provider core network, comprising:
   defining at each of a plurality of provider edge (PE) devices participating in the service, each participating PE being connected to the other participating PE's by a full mesh of mesh connections through the provider core network, a virtual core port that encompasses all of the ports on the PE that are associated with a mesh connection from the PE to one or more other PE's participating in the service;
   configuring each participating PE to associate the virtual core port with a virtual core bridge representing the core of the service domain; and
   ensuring that the virtual core bridge becomes and remains the root bridge for purposes of the spanning tree protocol (STP);
   wherein the virtual core bridge does not correspond to any one physical switch or bridge in the core of the service domain but instead represents collectively the core of the service domain; wherein for purposes of the spanning tree protocol (STP) each PE considers its virtual core port, which represents all of its mesh connections to PE's participating in the service, to be its root port; and wherein ensuring that the virtual core bridge becomes and remains the root bridge for purposes of the spanning tree protocol (STP) ensures that no physical switch can become the root bridge for purposes of the spanning tree protocol.

2. The method of claim 1 wherein configuring each participating PE to associated the virtual core port with a virtual core bridge representing the core of the service domain comprises causing each PB to generate a virtual root bridge protocol data unit (VRBPDU) associated with the virtual core port.

3. The method of claim 1 wherein ensuring that the virtual core bridge becomes and remains the root bridge comprises causing each PE to generate a virtual root bridge protocol data unit (VRBPDU) that is associated with the virtual core port and has a root priority of zero.

4. The method of claim 1 wherein ensuring that the virtual core bridge becomes and remains the root bridge comprises causing each PE to generate a virtual root bridge protocol data unit (VRBPDU) that does not age out.

5. The method of claim 1 further comprising using one or more layer 3 forwarding protocols to provide redundancy within the core network.

6. The method of claim 1 ensuring that the virtual core bridge becomes and remains the root bridge comprises performing a validity check on all bridge protocol data units (BPDU's) received at a participating PE on a port other than the virtual core port to ensure that the virtual core bridge remains the STP root bridge.

7. The method of claim 6 wherein the validity check comprises determining whether the received BPDU comprises a root bridge identifier that does not match a virtual root bridge identifier associated with the virtual core bridge.

8. The method of claim 6 wherein the validity check comprises determining whether the received BPDU comprises a root priority equal to zero.

9. The method of claim 6 further comprising, in the event the received BPDU comprises a root bridge identifier that does not match a virtual root bridge identifier associated with the virtual core bridge and has a root priority equal to zero, discarding the BPDU and placing a port associated with the BPDU in a non-forwarding state.

10. The method of claim 6 further comprising, in the event the received BPDU comprises a root bridge identifier that does not match a virtual root bridge identifier associated with the virtual core bridge and has a root priority equal to zero, discarding the BPDU and placing a service-based access point associated with the BPDU in a non-forwarding state.

11. The method of claim 1 further comprising detecting the format of a data unit associated with an instance of the STP running outside of the core network.

12. The method of claim 11 further comprising interacting with the instance of the STP running outside of the core network by sending one or more data units in the detected format.

13. A system for extending the Spanning Tree Protocol (STP) to provide redundancy and avoid loops in the topology of a service domain associated with a data transport service provided using a provider core network, comprising:
   one or more ports configured as mesh connections to one or more provider edge devices participating in the service; and
   a forwarding engine configured to treat said one or more ports configured as mesh connections as a single virtual core port for purposes of the STP, associate the virtual core port with a virtual core bridge, and ensure that the virtual core port becomes and remains the root bridge for purposes of the spanning tree protocol (STP);
   wherein the virtual core bridge does not correspond to any one physical switch or bridge in the core of the service domain but instead represents collectively the core of the service domain; wherein for purposes of the spanning tree protocol (STP) each PE considers its virtual core port, which represents all of its mesh connections to PE's participating in the service, to be its root port; and wherein ensuring that the virtual core bridge becomes and remains the root bridge for purposes of the spanning tree protocol (STP) ensures that no physical switch can become the root bridge for purposes of the spanning tree protocol.

14. A computer program product for extending the Spanning Tree Protocol (STP) to provide redundancy and avoid loops in the topology of a service domain associated with a data transport service provided using a provider core network, the computer program product being embodied in a computer readable storage medium and the computer program product comprising computer instructions for:

defining at each of a plurality of provider edge (PE) devices participating in the service, each participating PE being connected to the other participating PE's by a full mesh of mesh connections through the provider core network, a virtual core port that encompasses all of the ports on the PE that are associated with a mesh connection from the PE to one or more other PE's participating in the service;

configuring each participating PE to associated the virtual core port with a virtual core bridge representing the core of the service domain; and ensuring that the virtual core bridge becomes and remains the root bridge for purposes of the spanning tree protocol (STP);

wherein the virtual core bridge does not correspond to any one physical switch or bridge in the core of the service domain but instead represents collectively the core of the service domain; wherein for purposes of the spanning tree protocol (STP) each PE considers its virtual core port, which represents all of its mesh connections to PE's participating in the service, to be its root port; and wherein ensuring that the virtual core bridge becomes and remains the root bridge for purposes of the spanning tree protocol (STP) ensures such that no physical switch can become the root bridge for purposes of the spanning tree protocol.

* * * * *

UNITED STATES PATENT AND TRADEMARK OFFICE
CERTIFICATE OF CORRECTION

PATENT NO. : 7,508,774 B2  Page 1 of 1
APPLICATION NO. : 10/833822
DATED : March 24, 2009
INVENTOR(S) : Regan et al.

It is certified that error appears in the above-identified patent and that said Letters Patent is hereby corrected as shown below:

Claim 2
Column 8, line 7 delete "PB" and insert -- PE --

Claim 14
Column 10, line 4 delete "associated" and insert -- associate --

Signed and Sealed this

Twenty-seventh Day of October, 2009

David J. Kappos
*Director of the United States Patent and Trademark Office*